Sept. 24, 1963   C. F. PABST ETAL   3,104,572
LATHES
Filed Dec. 5, 1961   3 Sheets-Sheet 2

INVENTORS
Carl F. Pabst
Holland R. Hudson
BY
Synnestvedt & Lechner
ATTORNEYS

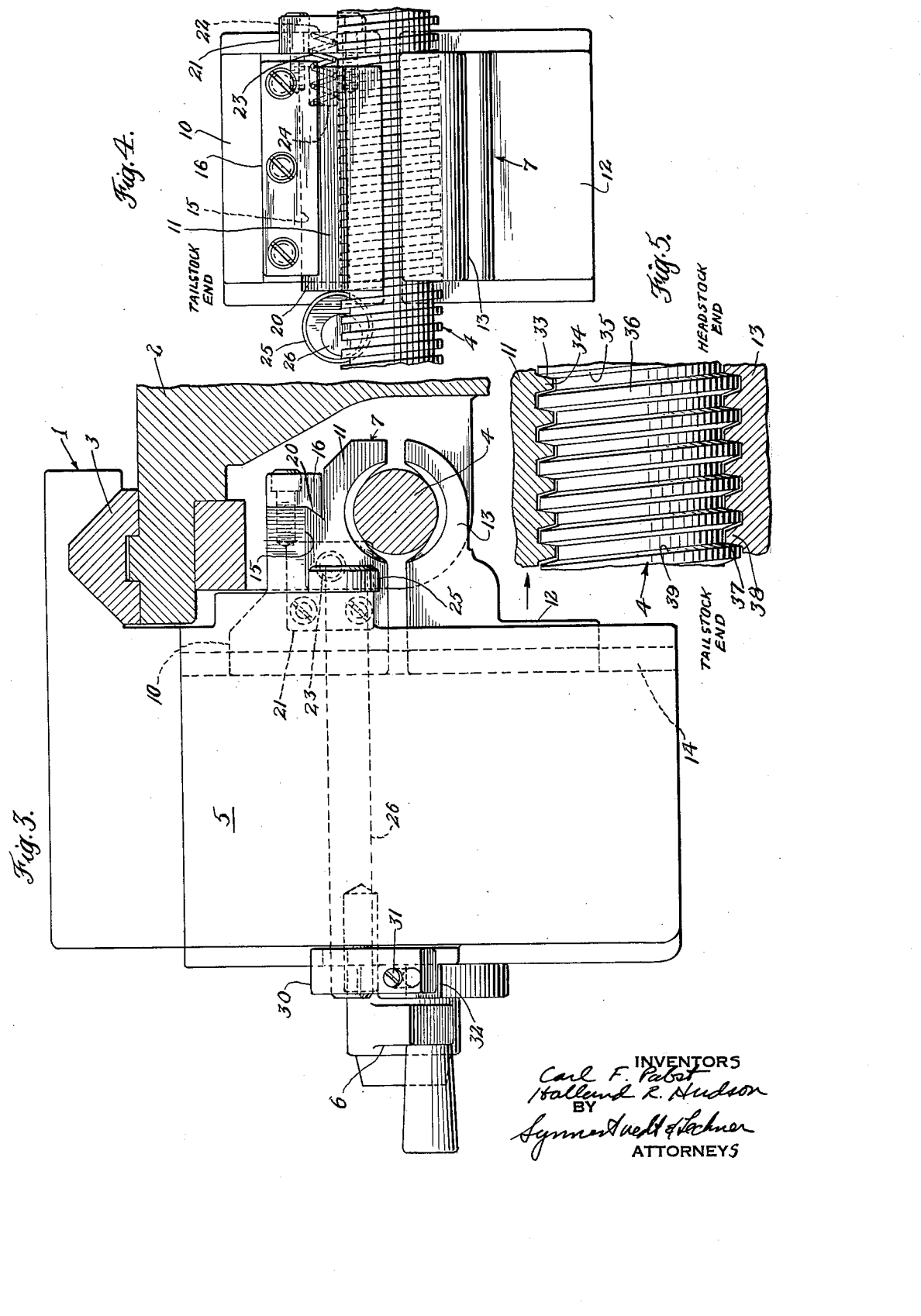

3,104,572
LATHES
Carl F. Pabst and Holland R. Hudson, Cincinnati, Ohio, assignors to The Lodge & Shipley Company, Cincinnati, Ohio, a corporation of Ohio
Filed Dec. 5, 1961, Ser. No. 157,190
2 Claims. (Cl. 82—23)

This invention relates to lathes of the kind wherein the carriage is moved both in the forward and reverse directions for complex contouring operations and in particular, the invention relates to an arrangement for such a lathe which will eliminate back lash in the carriage feed mechanism.

The type of lathe in question is controlled by a dual tracer operating two motors, one motor controlling the rotation of the cross feed screw, hence, the in and out motion of the cross slide and the other motor controlling the rotation of the lead screw, hence, the motion of the carriage along the ways.

Such a lathe is convertible from dual tracer to standard operation or vice versa by connecting the carriage with the lead screw or the feed rod, the engagement and disengagement of the carriage with the lead screw being effected by the engagement or disengagement of the split nut on the apron.

When the lathe of the kind in question is connected for dual tracer operation, it is often times necessary when machining complex contours for the carriage to be moved not only in the forward direction (toward the headstock) but also to be moved in the reverse direction (toward the tailstock). In both instances the carriage is powered by the lead screw which is rotated in one direction for forward motion and in the opposite direction for reverse operation.

The conversion of the lathe as between standard and dual tracer operation and the forward and reverse direction of motion of the carriage when being operated by the dual tracer gives rise to the very serious problem of back lash as between the lead screw and the split nut. For example, if there is any misalignment, wear or the like between the threads of the split nut and the threads of the lead screw, some back lash is bound to be present when the nut and screw are engaged. Also, back lash may be due to manufacturing tolerances on the nut and/or the lead screw.

Back lash poses a serious problem because when the direction of rotation of the lead screw is reversed, the lead screw rotates a certain amount prior to its engagement with the half nut. During this period the carriage is immovable. Thus, if the tracer required that the carriage move during the lag time, the tool position would be in error. And this is particularly true where the contour requires simultaneous carriage and cross slide motion.

Unless back lash is removed or compensated for, it is impossible to accurately contour complex shapes where both forward and reverse carriage motion is required.

Thus the principal object of the invention is to provide, in a lathe of the kind in question, an arrangement which will eliminate back lash in the carriage feed mechanism.

For the above purpose, the invention contemplates slidably mounting the top half of the split nut on the apron, so that it is capable of limited motion in a direction parallel to the axis of the lead screw, together with means which is operative to move the top half along the axis so that its thread engages one face of the lead screw thread and then to move the carriage and bottom nut (in the opposite direction) until the thread on the bottom nut engages the opposite face of the lead screw thread and then to maintain both engagements. When the lead screw is rotated in one direction, the power transmission to the carriage is through the top nut (but with the bottom nut and lead screw firmly engaged) and when the lead screw is rotated in the opposite direction, the power transmission to the carriage is through the bottom nut (but with the top nut and lead screw firmly engaged). With this arrangement the lead screw and carriage are always in driving engagement so there is no back lash and carriage reversal does not cause error in tool position.

A preferred construction of the invention will be explained in connection with the following drawings, wherein:

FIGURE 3 is a cross section taken along the line 3—3 of FIGURE 1;

FIGURE 4 is a face view looking toward the left in FIGURE 3 and showing the split nut engaged with the lead screw; and FIGURE 5 is an enlarged fragmentary view of the lead screw and split nut looking toward the left in FIGURE 3.

Figure 1:
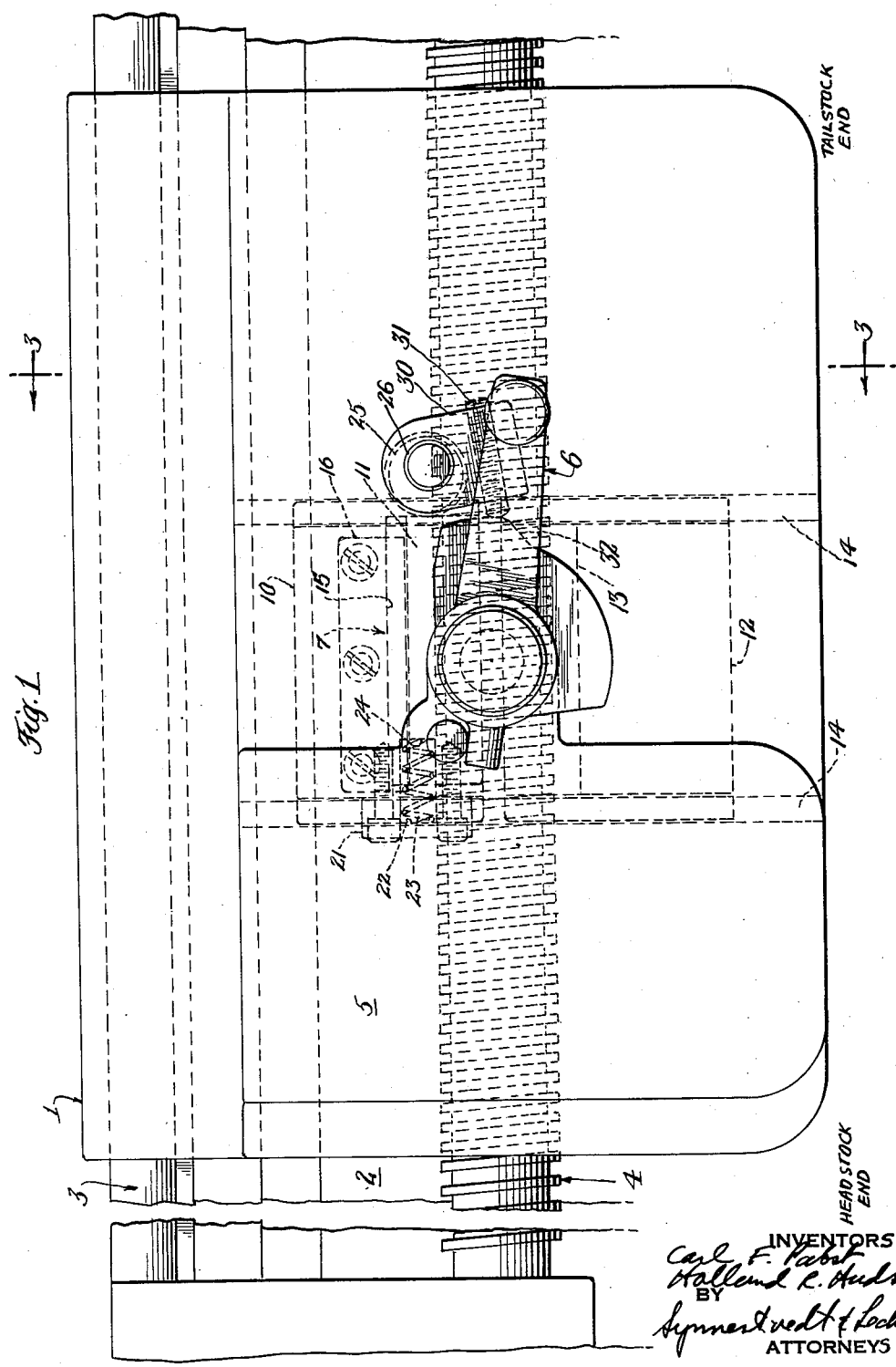
FIGURE 1 is a front elevational view illustrating the invention as incorporated in the apron of the lathe.
Figure 2:
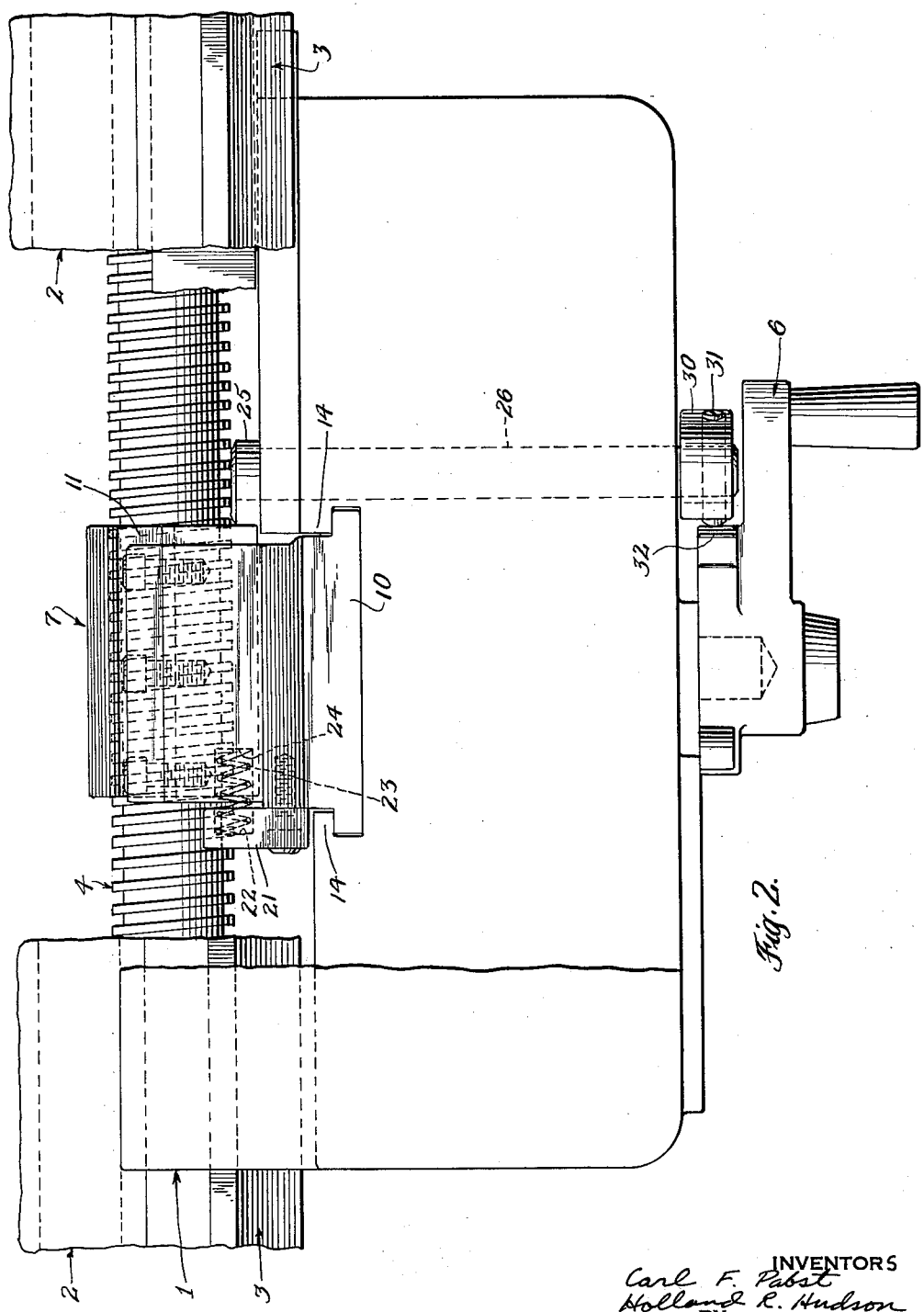
FIGURE 2 is a plan view of FIGURE 1 with certain parts of the apron and carriage removed.

In FIGURE 1 a carriage 1 is slidably mounted on the ways of a bed 2, the front way being indicated at 3. A lead screw, which is rotatably mounted on the bed is indicated at 4. The carriage apron is indicated at 5. The foregoing elements are conventional in lathes.

Rotatably mounted on the apron 5 is a handle 6 which is adapted to move the top and bottom parts of the split nut 7 for engaging and disengaging the same with the lead screw. In the position of the handle as shown, the two halves of the split nut are engaged with the lead screw. Rotation of the handle 6 counterclockwise causes the carrier 10, mounting the top nut 11, and the carrier 12, mounting the bottom nut 13, to move away from the lead screw. Rotation of the handle 6 clockwise moves the carriers and nuts toward the lead screw. The carriers 10 and 12 are mounted in conventional guideways 14. The handle 6 (except as for a cam surface as explained later) is conventional and the mechanism (not shown) connected with the handle 6 for causing the up and down motion of the carriers 10 and 11 is conventional.

The top nut 11 is mounted on guideways 15 in the carrier 10 and held in the guide by the bracket 16. Both the bracket and the carrier 10 have interfitting dovetails indicated at 20. This structure mounts the top nut 11 in the carrier so that it is movable back and forth in a direction along or parallel to the rotational axis of the lead screw 4.

As best shown in FIGURE 4, a bracket 21 is fixed to the carrier 10 and has a socket 22 carrying a spring 23. The spring extends into a socket 24 in the nut 11. The spring urges the nut 11 toward the left as viewed in FIGURE 4 (or toward the right as viewed in FIGURE 1) i.e., toward the tailstock. The axial motion of the nut 11 is controlled by the eccentric 25. With reference to FIGURE 4, it will be seen that rotation of the eccentric 25, say clockwise from the position shown, will cause the nut 11 to move to the right against the force of the spring 23. If the eccentric is moved counterclockwise, the force of the spring 23 will move the nut 11 toward the left (firm against the eccentric surface).

The eccentric is mounted on a shaft 26 exending through the apron and carrying an arm 30 mounting a set screw 31. The set screw 31 is adapted to be engaged by a cam surface 32 formed on the handle 6 depending upon the rotary position of the handle.

With reference to FIGURES 1, 4 and 5, assume that the eccentric is being rotated (counterclockwise as viewed in FIGURE 1 and clockwise as viewed in FIGURES 4 and 5) so that it has moved the nut 11 toward the headstock and that the face 33 of the thread 34 on the nut 11 has engaged the face 35 of the thread 36 of the lead screw 4.

The top nut 11 then is firm against the lead screw. With further rotation of the eccentric 25 the carriage (and bottom nut 13) will move toward the tailstock until the face 37 on the thread 38 of the bottom nut 13 engages the face 39 of the thread 36 of the lead screw. It will be noted that the thread 34 of the top nut 11 and thread 38 of the bottom nut 13 respectively engage opposite faces of the lead screw thread and that the engagements take place on opposite sides of a horizontal plane containing the lead screw rotational axes or over an arc of less than 180°.

When the lead screw is rotated (clockwise looking toward the right in FIGURES 4 and 5), power will be transmitted from the lead screw through the top nut 11 to the carriage (to move the same forward or toward the tailstock). If the rotation of the lead screw is reversed, power is transmitted through the bottom nut 13 to the carriage. It is important to note that in changing the condition of operation there was no back lash. This is so, because, when the screw was rotating clockwise to move the carriage forward, the bottom nut 13 and the lead screw were in engagement and when the direction of rotation of the lead screw was reversed there was a direct transmission of power from the lead screw to the bottom nut or carriage.

With reference to FIGURE 1, counterclockwise rotation of the handle 6 causes the top and bottom nuts to come out of engagement with the threads. During the first 20° of rotation the set screw 31 comes out of engagement with the surface 32. (The upward motion of the nut 11 against the eccentric 25 may tend to cause the eccentric to rotate clockwise.) When the handle 6 is moved clockwise, the surface 32 will come down and engage the set screw 31 and cause the shaft 26 to rotate so that the eccentric 25 engages the nut 11 to move the same axially toward the headstock and cause the threads on the nuts to engage the thread on the lead screw as previously described. When the handle 6 and eccentric 25 are in the position shown in FIGURE 1, the two nuts 11 and 13 are locked in their engaged positions with the lead screw.

Before closing it is pointed out that wear of the threads on the nut or lead screw can be compensated for by adjustment of the set screw 31.

We claim:
1. In a lathe:
a bed;
a carriage having an apron, the carriage being disposed on said bed for back and forth movement over the bed;
a lead screw mounted on said bed for rotation in opposite directions;
a first carrier mounted on said apron for movement in a direction toward and away from said lead screw;
a first nut on said carrier, the carrier mounting the nut for movement toward the lead screw to move the thread of the nut into engagement position with the thread of the screw and for movement of the nut away from the lead screw to move the thread of the nut out of engagement position;
a second carrier mounted on said apron for movement in a direction toward and away from said lead screw;
a second nut on said second carrier, the second carrier mounting the second nut for movement toward the lead screw to move the thread of the second nut into engagement position with the thread of the screw and for movement of the second nut away from the lead screw to move the thread of the second nut out of engagement position and the second carrier also mounting the second nut for movement relative to the second carrier along a path generally parallel the rotational axis of the lead screw;
an eccentric rotatably mounted on said apron and engaging one end of said second nut, rotation of the eccentric causing the nut to move along said path in one direction;
a spring mounted on said apron and urging the second nut to move along said path in a direction opposite to that caused by rotation of the eccentric;
a shaft rotatably mounting said eccentric on said apron;
an arm mounted on said shaft;
an operating handle for moving said carriers rotatably mounted on said apron for movement to a position wherein the threads of the nuts and lead screw are in engagement position and movable to a position wherein the threads of the nuts and lead screw are out of engagement position; and
means on said operating handle forming a cam surface positioned to engage said arm after the operating handle has moved to a position wherein the threads of the nuts and lead screw are in engagement position, the engagement of the cam surface with the arm causing rotation of the arm, the shaft and the eccentric, the rotation of the eccentric moving said second nut along said path and causing the thread of the second nut to be tightly engaged with one face of the lead screw thread and the thread of the first nut to be tightly engaged with the opposite face of the lead screw thread.
2. In a lathe:
a bed;
a carriage having an apron, the carriage being disposed on said bed for back and forth movement over the bed;
a lead screw mounted on said bed for rotation in opposite directions;
a first carrier mounted on said apron for movement in a direction toward and away from said lead screw;
a first nut on said carrier, the carrier mounting the nut for movement toward the lead screw to move the thread of the nut into engagement position with the thread of the screw and for movement of the nut away from the lead screw to move the thread of the nut out of engagement position;
a second carrier mounted on said apron for movement in a direction toward and away from said lead screw;
a second nut on said second carrier, the second carrier mounting the second nut for movement toward the lead screw to move the thread of the second nut into engagement position with the thread of the screw and for movement of the second nut away from the lead screw to move the thread of the second nut out of engagement position, the second carrier also mounting the second nut for movement relative to the second carrier along a path generally parallel the rotational axis of the lead screw;
an operating handle for moving said carriers rotatably mounted on said apron for movement to a position wherein the threads of the nuts and the lead screw are in engagement position and movable to a position wherein the threads of the nuts and lead screw are out of engagement position; and means on said apron having a driving connection with said operating handle and actuated by the handle after the handle has moved to a position wherein the threads of the nuts and lead screw are in engagement position to move said second nut along said path to cause the thread of the second nut to be tightly engaged with one face of the lead screw thread and the thread of the first nut to be tightly engaged with the opposite face of the lead screw thread.

References Cited in the file of this patent

UNITED STATES PATENTS

| | | |
|---|---|---|
| 136,184 | Russell | Feb. 25, 1873 |
| 959,911 | Bayles | May 31, 1910 |

OTHER REFERENCES

American Machinist, pp. 1193, August 20, 1903.